(12) United States Patent
Krishnamachari

(10) Patent No.: US 6,625,319 B1
(45) Date of Patent: Sep. 23, 2003

(54) IMAGE COMPRESSION USING CONTENT-BASED IMAGE SIMILARITY

(75) Inventor: Santhana Krishnamachari, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/281,353

(22) Filed: Mar. 30, 1999

(51) Int. Cl.⁷ .................................................. G06K 9/36
(52) U.S. Cl. ........................ 382/238; 382/173; 382/225; 348/394.1
(58) Field of Search ................................ 382/232, 233, 382/238, 166, 225, 155, 159, 244, 173, 276, 250, 246, 260; 348/394.1, 398.1, 403.1, 715, 699; 358/450, 453, 261.2, 432

(56) References Cited

U.S. PATENT DOCUMENTS

| 5,031,053 | A | * | 7/1991 | Chamzas et al. | ...... 358/426.11 |
| 5,606,655 | A | * | 2/1997 | Arman et al. | ................ 345/440 |
| 6,081,551 | A | * | 6/2000 | Etoh | ........................... 375/240 |
| 6,438,254 | B1 | * | 8/2002 | Kadono et al. | ............. 382/107 |
| 6,463,178 | B1 | * | 10/2002 | Kondo et al. | ................ 382/232 |

OTHER PUBLICATIONS

Minerva M. Yeung , Vi deo Broesing using Clustering and Scene Transitions on Compressed Sequences, May 1995, pp. 399–413.*

PHN 16,961—U.S. patent application Ser. No. 09/102,474, filed Jun. 22, 1998.

* cited by examiner

*Primary Examiner*—Jayanti K. Patel
*Assistant Examiner*—Sheela Chawan
(74) *Attorney, Agent, or Firm*—Russell Gross

(57) ABSTRACT

A method for compressing a set of images that includes the steps of grouping the images into at least two clusters based on color content similarity, identifying at least one representative image in each of the clusters, all other images within each of the clusters being identified as non-representative images, independently coding the representative image(s) from each of the clusters, e.g., using a lossy (e.g., JPEG) or lossless coding algorithm; and, predictively coding each of the non-representative images from each of the clusters using the representative image(s) from that cluster as a reference image(s).

40 Claims, 1 Drawing Sheet

IMAGE COMPRESSION USING CONTENT-BASED IMAGE SIMILARITY

BACKGROUND OF THE INVENTION

The present invention relates generally to image compression, and, more particularly, to a novel method for compressing a set of images by partitioning the set of images into at least one representative image and at least one non-representative image, and then using the at least one representative image as a reference image to differentially or predictively code the at least one non-representative image, thereby exploiting the redundancy among images to significantly improve image compression efficiency. As used hereinthroughout, the term image(s) refers to still pictures as opposed to moving pictures. Also, in general, it will be appreciated by those having ordinary skill in the pertinent art that the image compression techniques disclosed herein can be used to compress the images contained in an image database for transmission, processing, editing, handling, or for any other purpose. In this connection, the utility of the present application is not limited to any particular application, and the present invention is not limited to any particular application.

Typically, when a set of images is compressed, each individual image is compressed schemes like the one specified by the JPEG standard utilize spatial correlation to represent an image with fewer bits in order to thereby achieve compression. However, no presently known image compression technique attempts to predictively code one image with respect to another image in order to exploit the redundancy among images, to thereby achieve a higher level of image compression. Although motion coding is commonly employed in compressing moving pictures by predictively coding some pictures with reference to other pictures in order to achieve a higher level of compression, an analogous technique has not been applied to image compression.

Based on the above, it can be appreciated that there presently exists a need in the art for an image compression technique that not only attempts to exploit the spatial correlation in a given image, but also the correlation between different images, in order to thereby achieve a significantly higher level of image compression. The present invention fulfills this need in the art by utilizing content-based similarity (used in search and retrieval of similar images in an image database) to efficiently compress a given set of images. The given set of images is first grouped into different clusters based on their color similarity. From each cluster, a set of representative images are chosen. These representative images are coded with either a lossless coding scheme or a lossy coding scheme with a very high fidelity. The other images present in a cluster are coded predictively using these representative images. (The terms coding and compression are used interchangeably hereinthroughout.)

SUMMARY OF THE INVENTION

The present invention, in its broadest aspect, encompasses a method for compressing a set of images or sub-images that includes the steps of designating at least one representative image or sub-image in the set of images or sub-images, all other images or sub-images within the set of images or sub-images being designated as non-representative images or sub-images; independently coding the representative image(s) or sub-image(s), and, predictively coding each of the non-representative images or sub-images using the representative image(s) or sub-image(s) as a reference image(s) or sub-image(s). The present invention further encompasses a method for compressing a set of images that includes the steps of grouping the images into at least two clusters based on image similarity according to at least one image similarity measure, identifying at least one representative image in each of the clusters, all other images within each of the clusters being identified as non-representative images, independently coding the representative image(s) from each of the clusters, e.g., using a lossy (e.g., JPEG) or lossless coding algorithm; and, predictively coding each of the non-representative images from each of the clusters using the representative image(s) from that cluster as a reference image(s). In a presently preferred embodiment, the image similarity measure comprises a color similarity measure. However, the image similarity measure can be any suitable image similarity measure or combination thereof, e.g., a color similarity measure, a texture similarity measure, a shape similarity measure, a geometrical similarity measure, and/or a content similarity measure.

The present invention also encompasses a method for compressing a set of images, that includes the steps of subdividing each image into a two or more partitions; grouping corresponding ones of the partitions having corresponding locations in their respective images into at least two clusters based on image similarity according to at least one similarity measure, to thereby produce a set of clusters for each set of corresponding ones of the partitions; identifying at least one representative image for each cluster of partitions, all other images within each of the clusters being identified as non-representative images; independently coding a reference partition in the representative image(s) for each of the clusters; and, predictively coding each of the partitions in the non-representative images for each of the clusters using the reference partition(s) in the representative image(s) for that cluster as a reference partition(s). In one embodiment, the method further includes the step of subdividing, for each cluster, each partition of each non-representative image into a plurality of smaller target blocks, and each partition of the representative image(s) into a plurality of smaller reference blocks having the same size as the target blocks, wherein the predictively coding step is carried out, for each cluster, by:

for each of the target blocks, comparing the pixels of that target block to the pixels of each of the same-sized reference blocks in the reference partition(s) according to a prescribed search metric, and producing an error metric value for each comparison made;

for each of the target blocks, determining whether the value of any of the error metric values produced is less than a prescribed maximum threshold value, and:
if so, identifying the one of the same-sized reference blocks that constitutes the best match for that target block, and,
if not, independently coding that target block.

In another embodiment, the predictively coding step is carried out by, for each cluster, coding a difference between each non-representative partition and the reference partition(s) for that cluster.

The present invention also encompasses a method for compressing a set of sub-images that includes the steps of designating at least one representative sub-image in the set of sub-images, all other sub-images within the set of sub-images being designated as non-representative sub-images; independently coding the representative sub-image(s); and, predictively coding each of the non-representative sub-images using the representative sub-image(s) as a reference sub-image(s).

The present invention also encompasses a method for compressing a set of images that includes the steps of subdividing each image into a two or more partitions; grouping the partitions into at least two clusters based on image similarity according to at least one similarity measure; identifying at least one representative partition for each cluster of partitions, all other partitions within each of the clusters being identified as non-representative partitions; independently coding the representative partition(s) for each of the clusters; and, predictively coding each of the non-representative partitions in each of the clusters using the representative partition(s) for that cluster as a reference partition(s). In one embodiment, the method further includes the step of subdividing, for each cluster, each non-representative partition into a plurality of smaller target blocks, and the reference partition(s) into a plurality of smaller reference blocks having the same size as the target blocks, wherein the predictively coding step is carried out, for each cluster, by:

for each of the target blocks, comparing the pixels of that target block to the pixels of each of the same-sized reference blocks in the reference partition(s) according to a prescribed search metric, and producing an error metric value for each comparison made;

for each of the target blocks, determining whether the value of any of the error metric values produced is less than a prescribed maximum threshold value, and:

if so, identifying the one of the same-sized reference blocks that constitutes the best match for that target block, and, if not, independently coding that target block.

In another embodiment, the predictively coding step is carried out by, for each cluster, coding a difference between each non-representative partition and the reference partition(s) for that cluster.

In accordance with another optional aspect of the present invention, when a particular target image or partition has more than one reference image or partition in its cluster, then the one of the reference images or partitions that is the most similar, or at least most likely the most similar, e.g., the one of the reference images or partitions that shares the nearest common ancestor node in the cluster tree for that node, is selected as the reference image or partition for that particular target image or partition.

In a presently preferred embodiment, the method further includes the preliminary steps of partitioning each of the images into a plurality of color comparison blocks; computing a normalized histogram for each of the color comparison blocks of each image; and, using the computed normalized histograms in performing the grouping and identifying steps.

In an exemplary embodiment, each of the non-representative images or sub-images is coded with reference to a selected reference image or sub-image by partitioning the non-representative image or sub-image into a plurality of target blocks of pixels; for each of the target blocks, comparing the pixels of that target block to the pixels of each of the same-sized reference blocks in the reference image or sub-image according to a prescribed search metric, and producing an error metric value for each comparison made; and, for each of the target blocks, determining whether the value of any of the error metric values produced is less than a prescribed maximum threshold value, and:

if so, identifying the one of the same-sized reference blocks that constitutes the best match for that target block, and, if not, independently coding that target block.

The coded data stream can also include coded data identifying the reference blocks of the reference images that constitute the best match for the respective target blocks of each of the non-representative images that are not independently coded, identifying which of the target blocks of each of the non-representative images are independently coded, and further, identifying which of the images of the set of images are reference images, and which are non-representative images. Alternatively, or additionally, the predictively coding step can include the sub-steps of, for each of the target blocks that are not independently coded, computing a difference between that target block and the reference block that constitutes its best match, to produce a residual value for each of the target blocks that are not independently coded, wherein coded data representative of the computed residual values can also be inserted into the coded data stream.

The present invention also includes a device that implements the methodologies of the present invention.

BRIEF DESCRIPTION OF THE DRAWINGS

These and other objects, features, and advantages of the present invention will be readily understood from the following detailed description taken in conjunction with the accompanying drawings, in which.

DETAILED DESCRIPTION OF THE INVENTION

A hierarchical clustering algorithm for grouping images based on their color similarity is disclosed in co-pending U.S. patent application Ser. No. 09/102,474, for an invention entitled Image Retrieval System, assigned to the assignee of the present invention, and naming as co-inventors M. Abdel-Mottaleb and S. Krishnamachari, the disclosure of which is herein incorporated by reference. Given a set of images as the input, this hierarchical clustering algorithm generates as output a set of clusters. The images within each cluster are similar to each other with respect to the spatial distribution of colors therein. In the above-referenced patent application, this technique was used in the context of an image retrieval system for search and retrieval of similar images in an image database to search for images that "look" similar to a query image. This hierarchical clustering algorithm also provides for selecting representative images from each cluster.

In general, the above-mentioned hierarchical clustering algorithm works by partitioning each of the images into a plurality of color comparison partitions, then computing a normalized histogram for each of the color comparison partitions of each image. The thusly-computed normalized histograms are then used to group the images into optimal clusters, and to then select one or more representative images for each cluster. Details of this hierarchical clustering algorithm that is employed in connection with the presently preferred embodiment of the present invention can be learned by reference to the co-pending patent application mentioned above and incorporated herein by reference. However, it should be clearly understood that the present invention is not limited, in its broadest sense, to any particular image grouping or clustering algorithm, or, for that matter, to the use of any image grouping or clustering scheme, at all.

Figure 1:
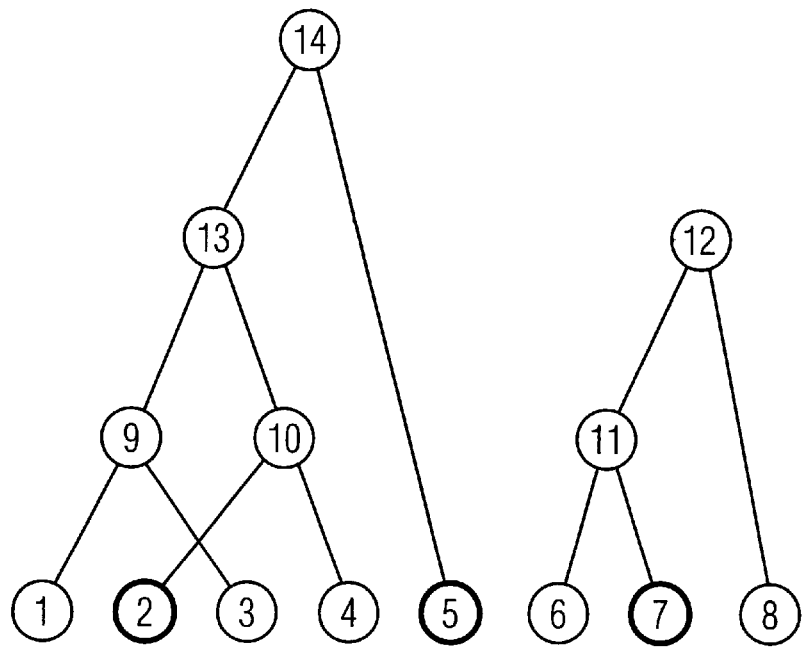
FIG. 1 is a diagram that illustrates the concept of hierarchical clustering algorithm utilized in connection with the image compression technique of an exemplary embodiment of the present invention; and, FIG. 2 is a diagram that illustrates the concept of predictive coding of a target image from reference images in accordance with the presently preferred embodiment of the image compression technique of the present invention.

FIG. 1 depicts how the hierarchical clustering technique disclosed in the above-referenced co-pending application works with respect to an illustrative case of a set of eight images, numbered from 1 to 8. First, the color histograms are computed for each image. Second, the similarities of all images are computed using the color histograms. Third, the images with the closest similarity are grouped, e.g., images 2 and 4 are grouped to form a node 10 of a cluster tree. This process is repeated until the root node of the cluster tree is reached. At the end of this hierarchical clustering process, in the illustrative case depicted in FIG. 1, the eight images are clustered into two groups, one with five images (the images numbered 1–5), and the other with three images (the images numbered 6–8). For the first cluster, the representative images are 2 and 5, and for the second cluster, the representative image is 7. These representative images are shown shaded in FIG. 1. Because of the nature of the clustering process, each cluster has an associated cluster tree. Unlike in this illustrative case, the number of representative images is usually about 10–20% of the total number of images in the cluster.

From the theory of clustering, it can be inferred that the images within a cluster are similar to each other. Hence, instead of attempting to compress these images independently, it is prudent to exploit the similarity between images to improve image compression efficiency. More particularly, the image compression scheme in accordance with a presently preferred embodiment of the present invention includes the following steps:

1. Group a given set of images into clusters based on their color content similarity and identify/designate at least one representative image for each cluster, all the remaining images in each cluster being designated as non-representative images.

2. In each cluster, compress the representative images using either a loss-less image coding technique or a lossy coding technique with very high fidelity. This can be done, for example, with a JPEG coding scheme for the lossy coding case. However, the particular coding scheme employed is not limiting to the present invention, in its broadest sense.

3. In each cluster, code the rest of the images (i.e., the non-representative images) using the representative images as reference images. To code a given non-representative image (referred to hereinafter as the "target image"), first the target image is broken up into many target blocks. For example, the target blocks can be 8-by-8 or 16-by-16 pixel blocks. For each target block in the target image, a similar block is searched for in the reference image(s). Once such a reference block is found, only the difference between the reference block in the reference image and the target block in the target image is coded. The residue (the difference between the target block and the reference block) is coded using well-known DCT (discrete cosine transform) and VLC (variable length coding) coding techniques. For a given target block, if there are no similar reference blocks present in the reference image(s), then the target block is coded nonpredictively (i.e., independently—without reference to any reference image).

In general, as will be readily appreciated by those skilled in the pertinent art, each target block in a target image can be compared with all possible same-sized reference blocks of a reference image located within specified horizontal and vertical search ranges of the current target block's corresponding location within the reference image in order to determine which of the same-sized reference blocks within the specified horizontal and vertical search ranges constitutes the best match according to a specified search metric (i.e., matching criterion). The hardware and/or software that performs this search is usually termed the "search engine", and there exists a number of well-known criteria for determining the quality of the match (i.e., the error metric for each comparison).

Among the best-known of these criteria (i.e., search metrics) are the Minimum Absolute Error (MAE), in which the search metric consists of the sum of the absolute values of the differences of each of the pixels in the target block with each of the corresponding pixels in the reference block; and the Minimum Square Error (MSE), in which the search metric consists of the sum of the squares of the above pixel differences. In either case, the match having the smallest value of the corresponding sum is selected as the best match within the specified search range, and its horizontal and vertical positions relative to the current target block therefore constitute a best match vector which can be coded using DCT or other suitable coding techniques to achieve even further image compression. If the resulting minimum sum (i.e., error metric) is nevertheless deemed too large, a decision could be made that a suitable match does not exist for the current target block, and that target block, in this case, could be coded independently of any reference block in the reference image(s). For the purposes of the present invention, either of the above two criteria, or any other suitable criterion, may be used.

With continuing reference to FIG. 1, the image compression scheme in accordance with a first alternative embodiment of the present invention includes the following steps:

1. Subdivide each image within a given set of images into two or more partitions (or, "sub-images"), e.g., a 256×256 pixel image can be subdivided into sixteen 64×64 pixel partitions.

2. Group the corresponding partitions into different clusters based on their color content similarity (e.g., based on the similarity of the color histograms of the partitions), e.g., with an image subdivided into 16 different partitions, 16 different sets of clusters are obtained, (and each set of clusters may contain two or more clusters). For example, if the partitions are numbered from 1 through 16 starting from the upper left-hand corner and ending at the lower right-hand corner of an image, then all partitions numbered 1 are grouped into one or more clusters, and then all partitions numbered 2 are grouped into one or more clusters, and so on. In general, all partitions numbered n (hereinafter referred to as partition "n", where n=1 through 16) are grouped into clusters, resulting in a total of n sets of clusters, where each set of clusters can contain two or more clusters.

3. Identify/designate at least one representative image for each cluster of partitions, all the remaining images in each cluster of partitions being designated as non-representative images.

4. Subdivide each partition of each image into a plurality of smaller blocks (e.g., 8×8 or 16×16 pixel blocks) to facilitate the predictive coding process. In each cluster of partitions, the reference partition(s) in the representative image(s) for that cluster is (are) coded (compressed) independently, using either a loss-less image coding technique or a lossy coding technique with very high fidelity. This can be done, for example, with a JPEG coding scheme for the lossy coding case. However, the particular coding scheme employed is not limiting to the present invention, in its broadest sense.

5. In each cluster of partitions, for each target block in a non-representative image, a similar block is searched for in the corresponding (reference) partition(s) of the representative image(s) for that cluster. Once such a reference block is found, only the difference between the reference block in the reference partition and the target block in the target partition is coded. The residue (the difference between the target block and the reference block) is coded using well-known DCT (discrete cosine transform) and VLC (variable length coding)-coding techniques. For a given target block, if there are no similar reference blocks present in the corresponding reference partition of the reference image(s), then the target block is coded non-predictively (i.e., independently—without reference to any reference partition). For example, with reference to FIG. 1, assume that image 5 was chosen as the representative image for the cluster containing partition 1 of image 2, and that image 4 was chosen as the representative image for the cluster containing partition 2 of image. Then, for target blocks in partition 1 of image 2, the reference blocks are chosen from partition 1 of representative image 5, and for target blocks in partition 2 of image 2, the reference blocks are chosen from partition 2 of representative image 4.

In general, as will be readily appreciated by those skilled in the pertinent art, each target block in a target partition can be compared with all possible same-sized reference blocks of a reference partition located within specified horizontal and vertical search ranges of the current target block's corresponding location within the reference partition in order to determine which of the same-sized reference blocks within the specified horizontal and vertical search ranges constitutes the best match according to a specified search metric (i.e., matching criterion).

With continuing reference to FIG. 1, the image compression scheme in accordance with a second alternative embodiment of the present invention includes the following steps:

1. Subdivide each image within a given set of images into two or more partitions (or, "sub-images"), e.g., a 256×256 pixel image can be subdivided into sixteen 64×64 pixel partitions.

2. Group all of partitions into different clusters based on their color content similarity (e.g., based on the similarity of the color histograms of the partitions), without reference to their locations within their respective images. Thus, only different clusters of partitions will be obtained, as opposed to a different set of clusters for each set of corresponding partitions, as with the first alternative embodiment.

3. Identify/designate at least one representative partition for each cluster of partitions, all the remaining partitions in each cluster of partitions being designated as non-representative partitions.

4. Subdivide each partition of each image into a plurality of smaller blocks (e.g., 8×8 or 16×16 pixel blocks) to facilitate the predictive coding process. In each cluster of partitions, the reference partition(s) for that cluster is (are) coded (compressed) independently, using either a loss-less image coding technique or a lossy coding technique with very high fidelity. This can be done, for example, with a JPEG coding scheme for the lossy coding case. However, the particular coding scheme employed is not limiting to the present invention, in its broadest sense.

5. In each cluster of partitions, for each target block in a non-representative partition, a similar block is searched for in the reference partition(s) for that cluster. Once such a reference block is found, only the difference between the reference block in the reference partition and the target block in the target partition is coded. The residue (the difference between the target block and the reference block) is coded using well-known DCT (discrete cosine transform) and VLC (variable length coding) coding techniques. For a given target block, if there are no similar reference blocks present in the reference partition(s), then the target block is coded nonpredictively (i.e., independently—without reference to any reference partition).

In accordance with yet other alternative embodiments of the present invention, step (4) (i.e., the step of subdividing each partition into a plurality of blocks) in each of the first and second alternative embodiments described above can be eliminated, whereby step (5) (i.e., the predictive coding step) can be performed by directly coding the difference between the target and reference partitions, rather than searching for a best match on a block-by-block basis. Of course, this technique will require a finer partitioning of the images in the clustering process in order to achieve a given image compression quality, which will entail additional computational overhead on the front end; however, by eliminating the necessity of block-by-block searching for a best match on the back end, the computational overhead associated with this process is eliminated. The trade-offs in computational overhead, image compression quality, expense, complexity, etc. will vary in dependence upon the particular application, e.g., due to the nature of the image database, such as the type and degree of similarity of the images, and the size of the database, among other considerations and factors.

With respect to any of the embodiments of the method of the present invention described above, when a particular target image or partition has more than one reference image or partition in its cluster, then a single one of the reference images or partitions can be selected for that particular target image or partition in any suitable manner. For example, with reference to FIG. 1, advantage can be taken of the fact that, due to the nature of the clustering process, each cluster will have a cluster tree, thereby providing a convenient way of identifying which reference image or partition within that cluster is most likely similar to or statistically most similar (i.e., most likely most similar) to that particular non-representative (target) image or partition.

To illustrate this point more particularly, consider the case of coding image 4 in FIG. 1, whereby a "best-match" reference block must be found for each target block in image 4. From the cluster tree for the cluster to which image 4 belongs, it can be inferred that images 2 and 4 are more similar to each other than images 4 and 5 because they share a common ancestor node (node 10) that is nearer than the common ancestor node (node 14) that images 4 and 5 share (that is precisely the reason why images 2 and 4 got clustered together before image 5 joined the cluster). Thus, in accordance with this additional optional aspect of the present invention, the image 2 can be selected as the single reference image for the image 4 during the predictive coding process. In general, in accordance with this additional aspect of the present invention, when a particular target image or partition has more than one reference image or partition in its cluster, then the one of the reference images or partitions that shares the nearest common ancestor node in the cluster tree for that node is selected as the reference image or partition for that particular target image or partition.

Figure 2:
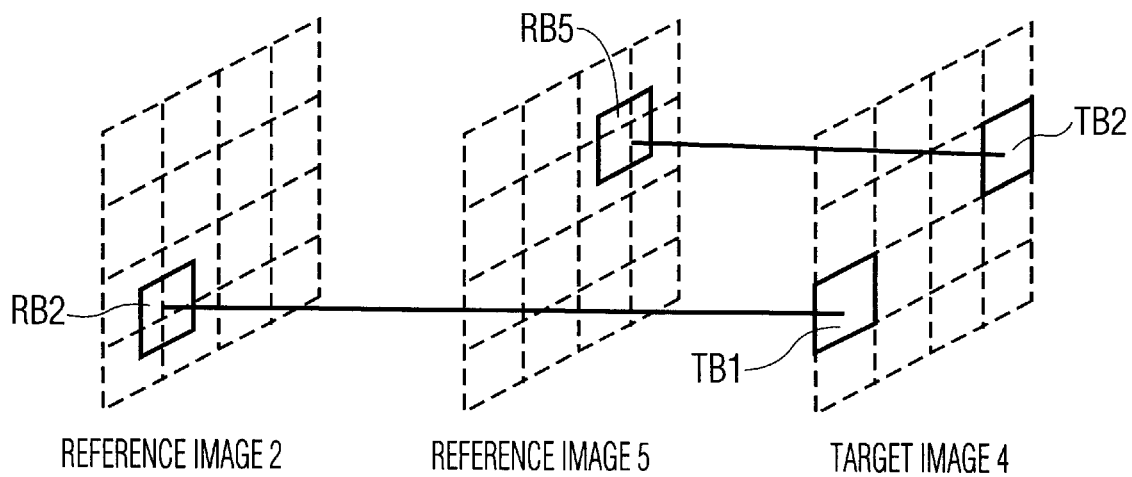

FIG. 2 diagrammatically depicts the presently preferred embodiment of the image compression method of the present invention, in which a first target block TB 1 in target image 4 is coded predictively using reference block RB2 from reference image 2, and a second target block TB2 in target image 4 is coded predictively using reference block RB5 from reference image 5.

Thus, the image compression/coding scheme of the present invention not only exploits the spatial redundancy in a given image by using the DCT coding technique, but also exploits the redundancy among images by grouping the images into clusters based on color similarity and then using the predictive coding technique to further compress the image data. This scheme will offer a high compression ratio (averaged over all images) for a required SNR or visual quality because it takes into account the similarity between images.

The procedure for decoding images coded in accordance with the above-described image compression method of the presently preferred embodiment of the present invention is different for reference and non-reference images. A reference image is directly decoded by performing variable length decoding and inverse DCT of the individual blocks of that reference image. A non-reference image is decoded in two steps. To decode each of the blocks in the non-reference image, first the corresponding reference block in one of the reference images is decoded followed by decoding the residual values in the target block. The values of the reference block and the decoded residual value are added together to give the actual value of the target block.

Although several presently preferred and alternative embodiments of the present invention have been described in detail hereinabove, it should be clearly understood that many variations and/or modifications of the basic inventive concepts taught herein that may appear to those skilled in the pertinent art will still fall within the spirit and scope of the present invention, as defined in the appended claims.

For example, although the above-described embodiments of the present invention each employ a clustering algorithm that uses a color similarity measure in order to measure the similarity between different images and to group the images (or partitions/sub-images) into clusters, and to then identify representative and non-representative images (or partitions/sub-images) within each cluster, it will be appreciated by those skilled in the art, that any other suitable image or sub-image grouping or clustering algorithm and/or image similarity measure(s) may alternatively or additionally be used, in any suitable combination.

For example, the image or sub-image similarity measure can be any combination of, e.g., a color similarity measure, a texture similarity measure, a shape similarity measure, a geometrical similarity measure, and/or a content similarity measure, all of which are well-known in the pertinent art. Further, it should be recognized that although the above-described embodiments of the present invention each employ a clustering algorithm in order to group the images or sub-images into different clusters, and to then select at least one representative image or sub-image within each cluster for predictive coding purposes, the present invention, in its broadest sense, does not require any such grouping or clustering of the images or sub-images, even though in many applications this technique will improve the image compression efficiency achieved.

Rather, the present invention, in its broadest sense, encompasses a method for compressing a set of images or sub-images that includes the steps of designating at least one representative image or sub-image in the set of images or sub-images, all other images or sub-images within the set of images or sub-images being designated as non-representative images or sub-images; independently coding the representative image(s) or sub-image(s); and, predictively coding each of the non-representative images or sub-images using the representative image(s) or sub-image(s) as a reference image(s) or sub-image(s). In this regard, how the images or sub-images are organized, grouped, arranged, or clustered, and how the representative image(s) or sub-image(s) are selected are not limitations of the present invention, in its broadest sense.

What is claimed is:

1. A method for compressing a set of images, including the steps of:

grouping the images into at least two clusters based on image similarity according to at least one similarity measure;

identifying at least one representative image in each of the clusters, all other images within each of the clusters being identified as non-representative images;

independently coding the representative image(s) from each of the clusters; and, predictively coding each of the non-representative images from each of the clusters using the representative image(s) from that cluster as a reference image(s).

2. The method as set forth in claim 1, wherein each of the non-representative images is coded with reference to a selected reference image in the predictively coding step by:

partitioning the non-representative image into a plurality of target blocks of pixels;

for each of the target blocks, searching the reference image for a same-sized reference block in the reference image that constitutes a best match according to a prescribed search metric; and, producing a coded data stream representative of which reference block, if any, in the reference image constitutes the best match for each target block.

3. The method as set forth in claim 2, wherein the independently coding step is carried out using a JPEG coding algorithm.

4. The method as set forth in claim 2, wherein the independently coding step is carried out using a lossless coding algorithm.

5. The method as set forth in claim 1, wherein each of the non-representative images is coded with reference to a selected reference image in the predictively coding step by:

partitioning the non-representative image into a plurality of target blocks of pixels;

for each of the target blocks, searching the reference image for a same-sized reference block in the reference image that constitutes a best match according to a prescribed search metric; and, for each of the target blocks, computing a difference between that target block and the reference block that constitutes its best match to produce a residual value for each target block; and, coding the residual values produced in the computing step to produce a coded data stream representative of the computed residual values.

6. The method as set forth in claim 5, wherein the independently coding step is carried out using a JPEG coding algorithm.

7. The method as set forth in claim 5, wherein the independently coding step is carried out using a lossless coding algorithm.

8. The method as set forth in claim 1, wherein each of the non-representative images is coded with reference to a selected reference image in the predictively coding step by:

partitioning the non-representative image into a plurality of target blocks of pixels;

for each of the target blocks, searching within prescribed horizontal and vertical search ranges within the reference image for a same-sized reference block in the reference image that constitutes a best match according to a prescribed search metric; and, producing a coded data stream representative of which reference block in the reference image constitutes the best match for each target block.

9. The method as set forth in claim 1, wherein each of the non-representative images is coded with reference to a selected reference image in the predictively coding step by:

partitioning the non-representative image into a plurality of target blocks of pixels;

for each of the target blocks, searching within prescribed horizontal and vertical search ranges within the reference image for a same-sized reference block in the reference image that constitutes a best match according to a prescribed search metric; and, for each of the target blocks, computing a difference between that target block and the reference block that constitutes its best match, to produce a residual value for each target block; and, coding the residual values produced in the computing step to produce a coded data stream representative of the computed residual values.

10. The method as set forth in claim 1, wherein the independently coding step is carried out using a JPEG coding algorithm.

11. The method as set forth in claim 1, wherein the independently coding step is carried out using a lossless coding algorithm.

12. The method as set forth in claim 1, wherein the grouping step is carried out by using a hierarchical clustering algorithm.

13. The method as set forth in claim 1, wherein the predictively coding step includes DCT and VLC coding sub-steps.

14. The method as set forth in claim 1, wherein each of the non-representative images is coded with reference to a selected reference image in the predictively coding step by:

partitioning the non-representative image into a plurality of target blocks of pixels;

for each of the target blocks, comparing the pixels of that target block to the pixels of each of the same-sized reference blocks in the reference image according to a prescribed search metric, and producing an error metric value for each comparison made;

for each of the target blocks, determining whether the value of any of the error metric values produced is less than a prescribed maximum threshold value, and:

if so, identifying the one of the same-sized reference blocks that constitutes the best match for that target block, and, if not, independently coding that target block.

15. The method as set forth in claim 14, wherein the sub-step of independently coding that target block is carried out using a JPEG coding algorithm.

16. The method as set forth in claim 14, wherein the predictively coding step further includes the sub-step of producing a coded data stream identifying the reference blocks of the reference images that constitute the best match for the respective target blocks of each of the non-representative images that are not independently coded, identifying which of the target blocks of each of the non-representative images are independently coded, and further, identifying which of the images of the set of images are reference images, and which are non-representative images.

17. The method as set forth in claim 14, wherein the predictively coding step further includes the sub-steps of:

for each of the target blocks that are not independently coded, computing a difference between that target block and the reference block that constitutes its best match, to produce a residual value for each of the target blocks that are not independently coded; and, coding the residual values produced in the computing step to produce a coded data stream representative of the computed residual values.

18. The method as set forth in claim 17, wherein the coding sub-step of the predictively coding further includes coding into the coded data stream coded data identifying the reference blocks of the reference images that constitute the best match for the respective target blocks of each of the non-representative images that are not independently coded, identifying which of the target blocks of each of the non-representative images are independently coded, and further, identifying which of the images of the set of images are reference images, and which are non-representative images.

19. The method as set forth in claim 14, further including the steps of:

partitioning each of the images into a plurality of color comparison blocks;

computing a normalized histogram for each of the color comparison blocks of each image; and, using the computed normalized histograms in performing the grouping and identifying steps.

20. A device that implements the method set forth in claim 14.

21. The method as set forth in claim 1, wherein the image similarity measure comprises a color similarity measure.

22. A device that implements the method set forth in claim 21.

23. The method as set forth in claim 1, wherein the similarity measure includes at least one similarity measure selected from a group consisting of a color similarity measure, a texture similarity measure, a shape similarity measure, a geometrical similarity measure, and a content similarity measure.

24. The method as set forth in claim 1, further including the steps of:

partitioning each of the images into a plurality of color comparison blocks;

computing a normalized histogram for each of the color comparison blocks of each image; and, using the computed normalized histograms in performing the grouping and identifying steps.

25. A device that implements the method set forth in claim 24.

26. A device that implements the method set forth in claim 1.

27. A method for compressing a set of sub-images, including the steps of:

grouping the sub-images into at least two clusters based on image similarity according to at least one similarity measure;

identifying at least one representative sub-image in each of the clusters, all other sub-images within each of the clusters being identified as non-representative sub-images;

independently coding the representative sub-image(s) from each of the clusters; and, predictively coding each of the non-representative sub-images from each of the clusters using the representative sub-image(s) from that cluster as a reference sub-image(s).

28. The method as set forth in claim 27, wherein each of the non-representative sub-images is coded with reference to a selected reference sub-image in the predictively coding step by:
   partitioning the non-representative sub-image into a plurality of target blocks of pixels;
   for each of the target blocks, comparing the pixels of that target block to the pixels of each of the same-sized reference blocks in the reference sub-image according to a prescribed search metric, and producing an error metric value for each comparison made;
   for each of the target blocks, determining whether the value of any of the error metric values produced is less than a prescribed maximum threshold value, and:
      if so, identifying the one of the same-sized reference blocks that constitutes the best match for that target block, and,
      if not, independently coding that target block.

29. The method as set forth in claim 27, wherein each of the non-representative sub-images is coded with reference to a selected reference sub-image in the predictively coding step by coding a difference between each non-representative sub-image and the representative sub-image(s).

30. A device that implements the method set forth in claim 27.

31. A method for compressing a set of images, including the steps of:
   subdividing each image into a two or more partitions;
   grouping corresponding ones of the partitions having corresponding locations in their respective images into at least two clusters based on image similarity according to at least one similarity measure, to thereby produce a set of clusters for each set of corresponding ones of the partitions;
   identifying at least one representative image for each cluster of partitions, all other images within each of the clusters being identified as non-representative images;
   independently coding a reference partition in the representative image(s) for each of the clusters; and,
   predictively coding each of the partitions in the non-representative images for each of the clusters using the reference partition(s) in the representative image(s) for that cluster as a reference partition(s).

32. The method as set forth in claim 31, further including the step of subdividing, for each cluster, each partition of each non-representative image into a plurality of smaller target blocks, and each partition of the representative image(s) into a plurality of smaller reference blocks having the same size as the target blocks, wherein the predictively coding step is carried out, for each cluster, by:
   for each of the target blocks, comparing the pixels of that target block to the pixels of each of the same-sized reference blocks in the reference partition(s) according to a prescribed search metric, and producing an error metric value for each comparison made;
   for each of the target blocks, determining whether the value of any of the error metric values produced is less than a prescribed maximum threshold value, and:
      if so, identifying the one of the same-sized reference blocks that constitutes the best match for that target block, and,
      if not, independently coding that target block.

33. The method as set forth in claim 31, wherein the predictively coding step is carried out by, for each cluster, coding a difference between each non-representative partition and the reference partition(s) for that cluster.

34. A device that implements the method set forth in claim 31.

35. A method for compressing a set of images, including the steps of:
   subdividing each image into a two or more partitions;
   grouping the partitions into at least two clusters based on image similarity according to at least one similarity measure;
   identifying at least one representative partition for each cluster of partitions, all other partitions within each of the clusters being identified as non-representative partitions;
   independently coding the representative partition(s) for each of the clusters; and,
   predictively coding each of the non-representative partitions in each of the clusters using the representative partition(s) for that cluster as a reference partition(s).

36. The method as set forth in claim 35, further including the step of subdividing, for each cluster, each non-representative partition into a plurality of smaller target blocks, and the reference partition(s) into a plurality of smaller reference blocks having the same size as the target blocks, wherein the predictively coding step is carried out, for each cluster, by:
   for each of the target blocks, comparing the pixels of that target block to the pixels of each of the same-sized reference blocks in the reference partition(s) according to a prescribed search metric, and producing an error metric value for each comparison made;
   for each of the target blocks, determining whether the value of any of the error metric values produced is less than a prescribed maximum threshold value, and:
      if so, identifying the one of the same-sized reference blocks that constitutes the best match for that target block, and,
      if not, independently coding that target block.

37. The method as set forth in claim 35, wherein the predictively coding step is carried out by, for each cluster, coding a difference between each non-representative partition and the reference partition(s) for that cluster.

38. The method as set forth in claim 35 wherein in the case of a particular non-representative partition having more than one representative partition in its cluster, selecting a one of the representative partitions that is most similar to the particular non-representative partition as the reference partition for that particular non-representative partition.

39. The method as set forth in claim 35, wherein in the case of a particular non-representative partition having more than one representative partition in its cluster, selecting a one of the representative partitions that shares a nearest common ancestor node in a cluster tree for that cluster as the reference partition for that particular non-representative partition.

40. A device that implements the method set forth in claim 35.

* * * * *